Patented June 12, 1928.

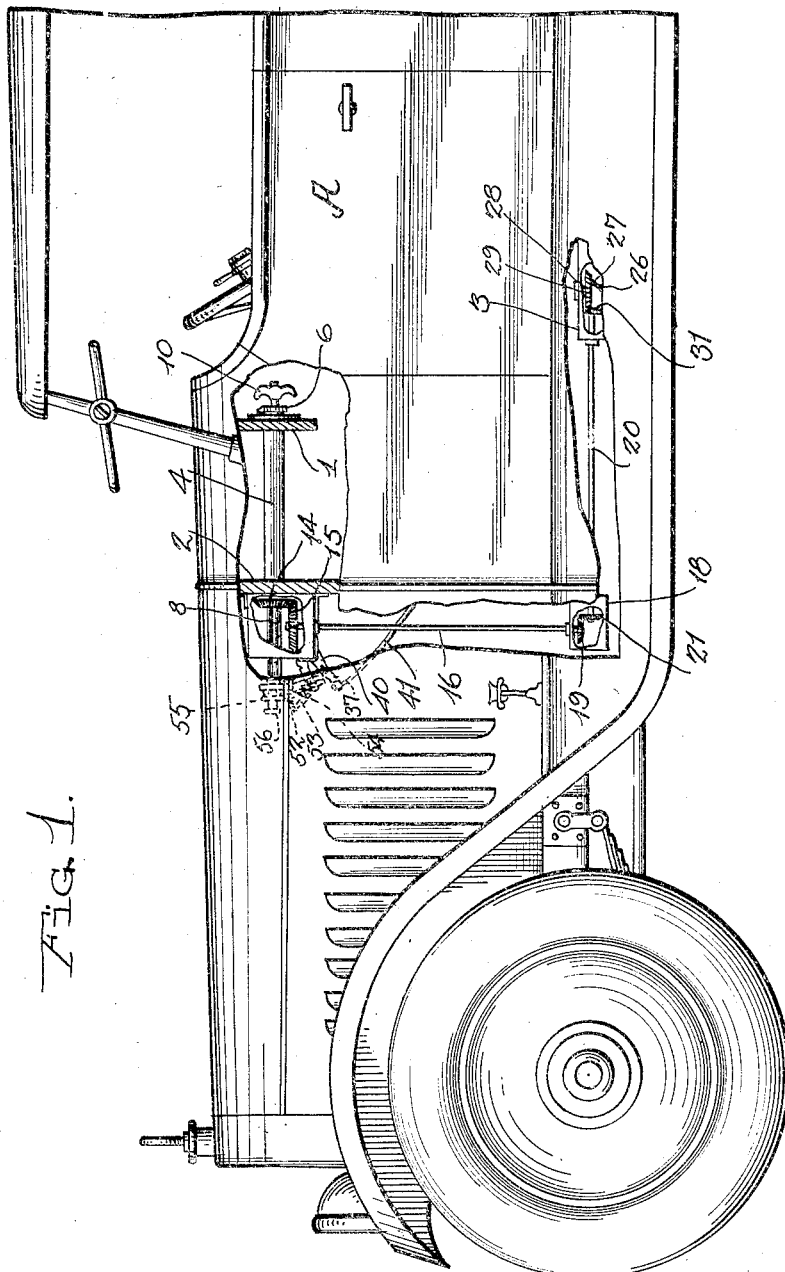

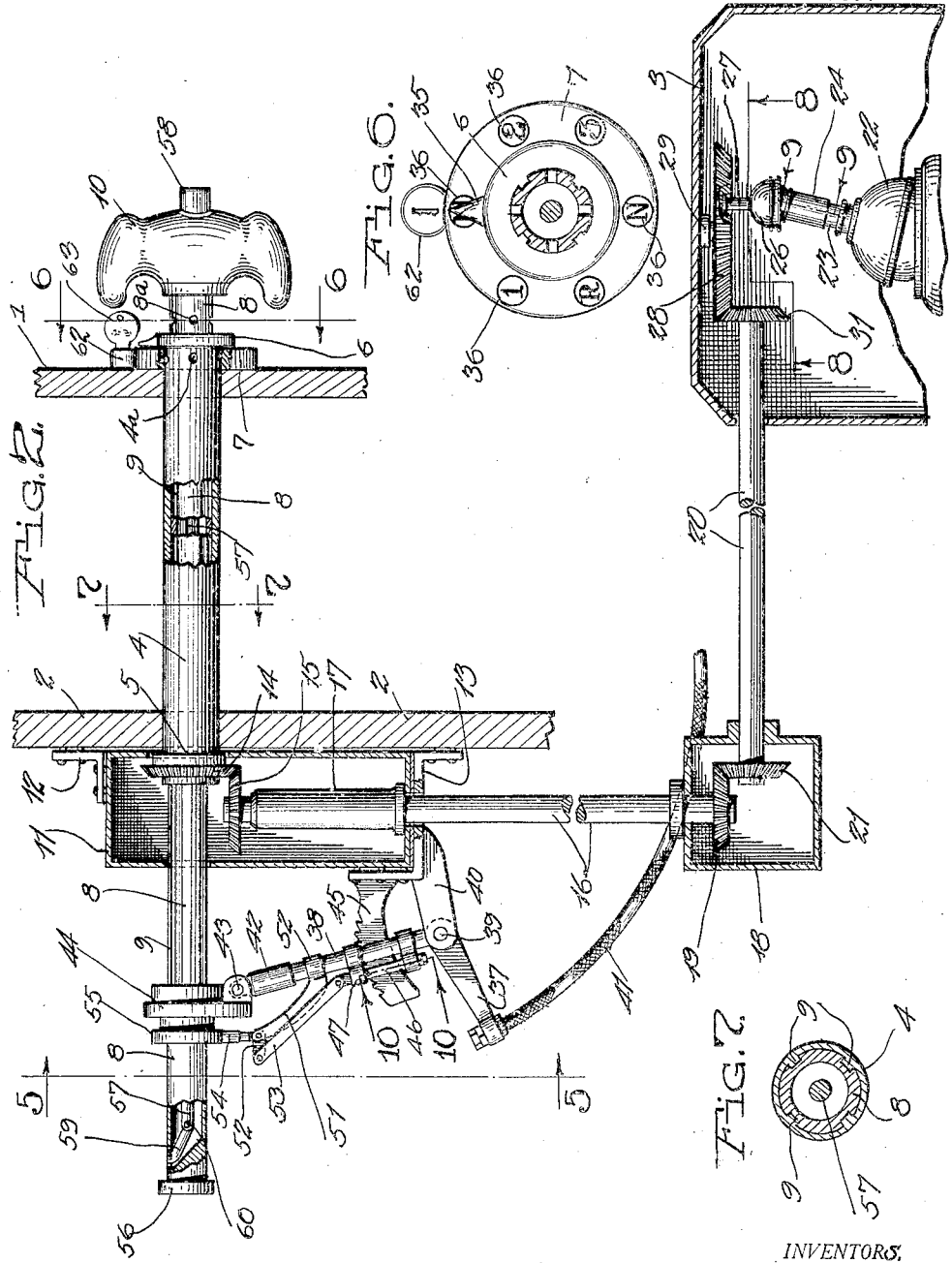

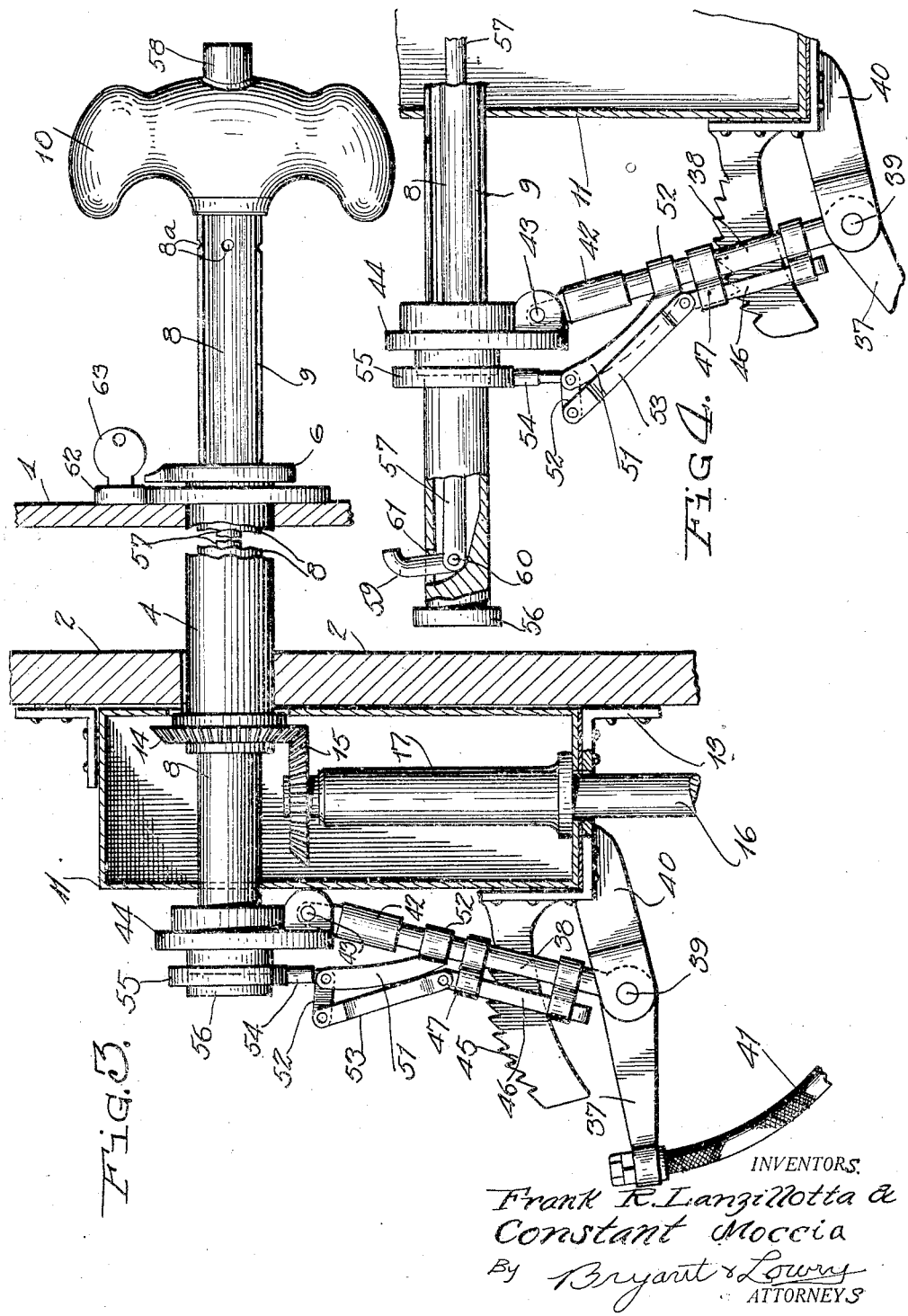

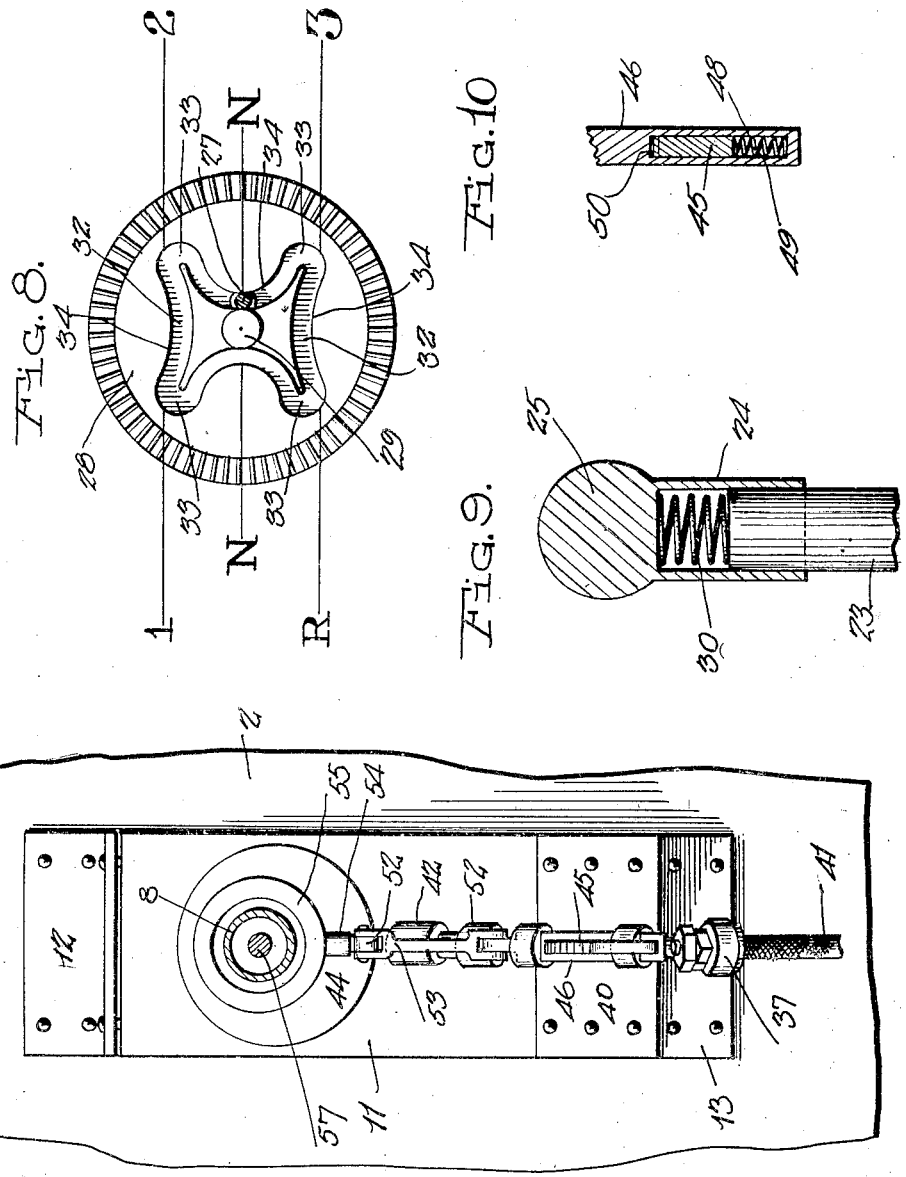

1,673,688

UNITED STATES PATENT OFFICE.

FRANK R. LANZILLOTTA AND CONSTANT MOCCIA, OF LYNCH, KENTUCKY, ASSIGNORS OF ONE-THIRD TO RUDOLPH LANZILLOTTA, OF LYNCH, KENTUCKY.

COMBINED TRANSMISSION AND BRAKE-CONTROLLING MECHANISM.

Application filed June 21, 1927. Serial No. 200,470.

This invention relates to certain new and useful improvements in combined transmission and brake controlling mechanism.

The primary object of this invention is to provide a combined transmission and brake controlling mechanism comprising a hand operated device preferably mounted upon the instrument board of the vehicle and eliminating the use of the ordinary wabble stick or gear shifting lever together with the hand and foot operated brakes to provide an unobstructed area and foot space forwardly of the front seat of the vehicle.

A further object of the invention is to provide a combined transmission and brake controlling mechanism that has been controlled in a manner for association with transmission and brake mechanisms of standard construction.

A further object of the invention is to provide a mechanism of the above type having a key controlled lock associated therewith so that the hand operated device may be retained against movement for locking both the transmission and brake mechanism.

With the above and other objects in view that will become apparent as the nature of the invention is better understood, the same consists in the novel form, combination and arrangement of parts hereinafter more fully described, shown in the accompanying drawings and claimed.

In the accompanying drawings wherein like reference characters are employed to designate corresponding parts throughout the several views, Figure 1 is a fragmentary side elevational view, partly broken away of an automobile equipped with the combined transmission and brake controlling mechanism showing the operating handle on the instrument board;

Figure 2 is a vertical longitudinal sectional view, partly in elevation of the combined transmission and brake controlling mechanism showing the operating means for the transmission stub shaft that has replaced the usual gear shift lever and the brake operating mechanism, the brake lever being in its forward releasing position;

Figure 3 is an enlarged fragmentary sectional view of the brake operating mechanism showing the mechanism in its brake applied position and with the operating handle therefor withdrawn or extended;

Figure 4 is a fragmentary sectional view showing parts of the brake operating mechanism positioned to effect the release of the brakes;

Figure 5 is a cross-sectional view taken on line 5—5 of Figure 2;

Figure 6 is a cross-sectional view taken on line 6—6 of Figure 2 showing the dial plate for indicating relationship of the transmission gears;

Figure 7 is a cross-sectional view taken on line 7—7 of Figure 2 showing the spline connection between the operating rod for the brake mechanism and the tubular shaft for the gear shifting mechanism;

Figure 8 is a detail sectional view taken on line 8—8 of Figure 2 showing the cam slot in the bevel gear that receives a stud carried by the short shaft of the transmission mechanism;

Figure 9 is a detail sectional view taken upon line 9—9 of Figure 2; and

Figure 10 is a detail sectional view taken on line 10—10 of Figure 2 showing the tensioned brake lever catch inclosing the rack segment.

This invention being designed for association with an automobile of standard construction, an automobile A is shown in Figure 1 with the usual instrument board 1, cowl 2 and transmission housing 3.

The tubular shaft 4 is journaled at its opposite ends in the instrument board 1 and cowl 2 and is retained against longitudinal shifting movement by the bearing block 5 at the forward end thereof that engages the forward side of the cowl 2, and the ring 6 upon the inner end thereof that engages the dial plate 7 through which the inner end of the tubular shaft rotates with the dial plate suitably secured to the instrument board 1 at the front side thereof. To effect rotation of the tubular shaft 4, there is provided a tubular rod 8 within the tubular shaft that is splined therein as at 9, and clearly shown in Figure 2, the tubular rod 8 being slidable through the tubular sleeve and imparting rotary motion to the latter. The inner end of the tubular rod 8 has an operating handle 10 fixed thereto by which the tubular rod 8 may be rotated for imparting rotary movement to the tubular shaft 4 and also for reciprocating the tubular rod within the tubular shaft.

A housing or casing 11 is mounted upon brackets 12 and 13 at the forward side of the cowl 2, the forward end of the tubular shaft 4 extending into the casing 11 while the tubular rod 8 extends through and forwardly of the casing as illustrated. A bevel gear 14 is fixed to the bearing block 5 carried by the forward end of the tubular shaft 4 within the casing 11 and meshes with the bevel gear 15 that is fixed to the upper end of the vertical shaft 16 that extends upwardly through the bottom wall of the housing and supported at its upper end below the bevel gear 15 by the tubular bearing 17 that rests upon the bottom wall of the casing 11. The lower end of the vertical shaft 16 extends into the casing 18 that forms a bearing for the lower end thereof and the lower end of the shaft 16 within said casing 18 has a bevel gear 19 fixed thereto. As shown in Figure 2, the shaft 20 is journaled at its opposite ends in the casing 18 and transmission housing 3, the ends of the shaft 20 within the casing 18 carrying a bevel gear 21 that meshes with the bevel gear 19 upon the lower end of the vertical shaft 16.

The universal bearing 22 within the transmission housing 3 and which is of standard construction has projecting therefrom a relatively short stub shaft 23 in lieu of the usual gear shifting lever. The upper end of the stub shaft 23 extends into the tubular socket 24 that is carried by the ball part 25 of a ball and socket joint, the socket part 26 of the ball and socket joint carrying a stub shaft 27 that extends into a groove formed in the lower side of the bevel gear 28 that is journaled as at 29 upon the lower face of the top wall 3 of the transmission housing. As shown in Figure 9, a coil spring 30 is disposed in the tubular socket 24 between the upper end of the stub shaft 23 in the ball path of the ball and socket joint for holding the ball part at its limit of upward movement and in operative engagement with the socket part 26. The end of the shaft 20 within the transmission housing 3 carries a fixed bevel gear 31 that meshes with the bevel gear 28.

The groove in the bottom face of the bevel gear 28 is shown more clearly in Figure 8, the groove 32 being of cam formation defining a tortuous passage for the stub shaft 27, the cam slot 32 having four extended portions 33 with curved connecting portions 34 directed toward the axis of the gear 28, the four extended portions 33 representing the three speeds forward and reverse, while the connecting curved portions 34 of the slot designate neutral positions of the transmission mechanism.

The indicator ring 6 carries a finger 35 that cooperates with the characters 36 upon the dial plate 7 for determining the relative positions of the gear shifting mechanism.

In shifting the gears, the tubular rod 8 is rotated by the handle 10 to impart rotary movement to the tubular shaft 4 and through the chain of meshing gears above described, the bevel gear 28 is rotated. The cam slot 32 in the gear 28 shifts the stub shafts 27 and 23 into the desired positions which are determined by the indicator finger 35 moving over the dial plate 7, it being understood that the clutch is opened during the act of shifting the gears.

The brake mechanism is operated by the tubular rod 8, the brake mechanism comprising a bell crank lever having the legs 37 and 38 pivotally supported as at 39 upon the arm 40 that extends from the lower bracket 13 that supports the casing 11. The free end of the bell crank leg 37 has one end of a cable 41 or other connector anchored thereto with the other end of the connector extending to the brake. The brake is of the type embodying a spring for normally holding the brake in disengaged position. The upper end of the leg 38 freely extends into the socket member 42 that is pivotally attached as at 43 to the lower side of the collar 44 that is freely mounted upon the rod 8. A rack segment 45 carried by the bracket 13 adjacent the bell crank leg 38 has the latch rod 46 shown in detail in Figure 10 associated therewith. The latch rod 46 being slidable in guides 47 carried by the bell crank leg 38 and having a slot 48 therein for enclosing the rack segment 45, a coil spring 49 interposed between the bottom wall of the slot and the lower face of the rack segment normally tending to lower the latch rod 46 with the dog 50 at the upper end of the slot 48 cooperating with the teeth of the rack segment 45. A bracket arm 51 is fixed at 52 to the bell crank leg 38 and pivotally supports at its upper end a bell crank lever 52$^a$, one leg of which has a link connection 53 with the upper end of the latch rod 46. The other leg of the bell crank lever 52$^a$ extends into the socket member 54 carried by the ring 55 that is freely supported upon the tubular rod 8 forwardly of and adjacent the block 44. The forward end of the tubular rod 8 is provided with a disk head 56 for purposes now to appear.

The brake mechanism as shown in Figure 3 is in its applied position and to accomplish braking action, the tubular rod 8 is pulled rearwardly by grasping the handle 10 and during such movement, the disk head 56 upon the forward end of the tubular rod moves through the ring 55 and engages the block 44, the block being shifted rearwardly to a position adjacent the casing 11 for operating the bell crank lever comprising the legs 37 and 38 for actuating the connector 41 between the bell crank leg 37 and the brakes for applying the brakes against the spring tension thereon. During this movement, the dog 50 upon the latch rod 46 ratchets over the teeth of the segment 45 for holding the brakes in applied position. The tubular rod 8 may then be forwardly shifted so that the handle 10 may be disposed in proximity of the instrument board 1 with the brakes retained in applied condition.

To release the brake mechanism from the applied position shown in Figure 3 and with the tubular rod 8 extended as shown in Figure 2, the rod 57 is operated, the rod 57 being reciprocably mounted within the tubular rod 8 with the inner end thereof projecting through the handle 10 to form an operating button 58 while the forward end has a link 59 pivoted thereto as at 60 that is adapted to be projected through the side opening 61 in the forward end of the tubular rod 8 when the rod 57 is projected by pressing the button 58 into the position shown in Figure 4. With the link 59 so disposed, the tubular rod 8 is withdrawn by grasping the handle 10 and the link 59 is moved into engagement with the ring 55 for moving the same and the bell crank lever 52ᵃ and link 53 to release the latch rod 46 from engagement with the rack segment 45. The latch rod 46 is maintained disengaged from the rack segment 45 during the initial forward projection of the tubular rod 8 as the ring 55 and block 44 move forwardly under the influence of the springs associated with the wheel brakes. The connector 41 between the brakes and lever 37 causes the lever 37 and 38 that is integral therewith to move the catch device over the rack segment. During this movement, the ring 55 is still retained by the link 59 and holds the catch elevated from the rack 45. When the brake springs have spent their force and the tubular rod 8 further projected, the link 59 is disposed forwardly of the ring 55 to permit the latch 46 to descend, by action of the spring 49 with the brakes fully released. The link 59 may be restored to the bore of the tubular rod 8 by a pull on the button 58.

A lock device is associated with the tubular shaft 4 and tubular rod 8 to prevent operation of the transmission and brake mechanism, the lock structure 62 operated by the key 63 having a sliding bolt that is adapted to be projected into the openings 4ᵃ and 8ᵃ in the tubular shaft and tubular rod respectively for holding the same against movement, this feature of the invention being shown in Figure 2.

From the above detailed description of the invention, it is believed that the construction and operation thereof will at once be apparent, it being noted that the transmission and brake mechanism are operated by the single device comprising the tubular shaft and tubular rod, the gears being shifted upon rotation of the tubular shaft while the brakes are applied upon reciprocating or pulling on the tubular rod 8. It is also possible to lock the gear shifting mechanism against movement without effecting the brake mechanism by positioning the tubular rod 8 in the position shown in Figure 2 so that the lock mechanism is only engaged with the tubular shaft, and while there is herein shown and described the preferred embodiment of the present invention, it is nevertheless to be understood that minor changes may be made therein without departing from the spirit and scope of the invention as claimed.

What we claim as new is:—

1. In a combined transmission and brake controlling mechanism for automobiles, the combination with transmission and brake mechanism, of a rotatable and reciprocating device for operating both of said mechanisms.

2. In a combined transmission and brake controlling mechanism for automobiles, the combination with transmission and brake mechanism, of a rotatable and reciprocating device for operating both of said mechanisms, one of said mechanisms being operated during rotation of said device and the other mechanism being operated during reciprocation thereof.

3. In a combined transmission and brake controlling mechanism for automobiles, the combination with transmission and brake mechanism, of a single device for operating both of said mechanisms, said device comprising a rotatable tubular shaft having gear connections with the transmission mechanism, and a rod reciprocably splined in the tubular shaft and operatively engaged with the brake mechanism.

4. In a combined transmission and brake controlling mechanism for automobiles, the combination with transmission and brake mechanism, of a single device for operating both of said mechanisms, said device comprising a rotatable tubular shaft having gear connections with the transmission mechanism and a rod reciprocably splined in the tubular shaft and operatively engaged with the brake mechanism, the connection between the tubular shaft and transmission including a gear wheel having a cam groove in one face and a stub shaft from the transmission mechanism extending into the groove.

5. In a combined transmission and brake controlling mechanism for automobiles, the combination with transmission and brake mechanism, of a single device for operating both of said mechanisms, said device comprising a rotatable tubular shaft having gear connections with the transmission mechanism, a rod reciprocably splined in the tubular shaft and operatively engaged with the brake mechanism, the connection between the tubular shaft and transmission including a gear wheel having a cam groove in one face and a stub shaft from the transmission mechanism extending into the groove, and an indicator associated with the tubular shaft to indicate the location of the stub-shaft in the cam groove for determining the relative gear positions.

6. In a combined transmission and brake controlling mechanism for automobiles, the combination with transmission and brake mechanism, of a single device for operating both of said mechanisms, said device comprising a rotatable tubular shaft having gear connections with the transmission mechanism, a rod reciprocably splined in the tubular shaft and operatively engaged with the brake mechanism, the connection between the tubular shaft and transmission including a gear wheel having a cam groove in one face and a stub shaft from the transmission mechanism extending into the groove, and key-operated lock mechanism for separately holding the tubular shaft against rotation, and for locking the tubular shaft and reciprocating rod against movement.

7. In a combined transmission and brake controlling mechanism for automobiles, the combination with transmission and brake mechanism, of a single device for operating both of said mechanisms, said device comprising a rotatable tubular shaft having gear connections with the transmission mechanism, a rod reciprocably splined in the tubular shaft and operatively engaged with the brake mechanism, the connection between the tubular shaft and transmission including a gear wheel having a cam groove in one face and a stub shaft from the transmission mechanism extending into the groove, an indicator associated with the tubular shaft to indicate the location of the stub-shaft in the cam groove for determining the relative gear positions, and key-operated lock mechanism, for separately holding the tubular shaft against rotation, and for locking the tubular shaft and reciprocating rod against movement.

8. In a combined transmission and brake controlling mechanism for automobiles, the combination with transmission and brake mechanism, of a single device for operating both of said mechanisms, said device comprising a rotatable tubular shaft having gear connections with the transmission mechanism, and a rod reciprocably splined in the tubular shaft and operatively engaged with the brake mechanism, the connection between the tubular shaft and transmission including a gear wheel having a cam groove in one face and a stub shaft from the transmission mechanism extending into the groove, said stub shaft having a universal joint intermediate its ends and a spring device for holding the ports of the joint in assembly.

9. In a combined transmission and brake controlling mechanism for automobiles, the combination with transmission and brake mechanism, of a single device for operating both of said mechanisms, said device comprising a rotatable tubular shaft having gear connections with the transmission mechanism, a rod reciprocably splined in the tubular shaft and operatively engaged with the brake mechanism, a rack segment supported on the cowl of the automobile, a pivoted brake lever carrying a latch rod movable over the rack segment, connections between the brake lever and automobile brakes, and cooperating means carried by the reciprocating rod and brake lever for operating the brake lever upon a pull on the reciprocating rod.

10. In a combined transmission and brake controlling mechanism for automobiles, the combination with transmission and brake mechanism, of a single device for operating both of said mechanisms, said device comprising a rotatable tubular shaft having gear connections with the transmission mechanism, a rod reciprocably splined in the tubular shaft and operatively engaged with the brake mechanism, a rack segment supported on the cowl of the automobile, a pivoted brake lever carrying a latch rod movable over the rack segment, connections between the brake lever and automobile brakes, cooperating means carried by the reciprocating rod and brake lever for operating the brake lever upon a pull on the reciprocating rod, and cooperating means carried by the reciprocating rod and latch rod for releasing the latch rod from the segment.

11. In a combined transmission and brake controlling mechanism for automobiles, the combination with transmission and brake mechanism, of a single device for operating both of said mechanisms, said device comprising a rotatable tubular shaft having gear connections with the transmission mechanism, a rod reciprocably splined in the tubular shaft and operatively engaged with the brake mechanism, a tubular rod reciprocably splined in the tubular shaft and operatively engaged with the brake mechanism, said engagement comprising a rack segment, a brake lever and latch rod moving thereover, connections between the brake lever and automobile brakes, cooperating means on the tubular rod and brake lever for operating the brake lever upon a pull on the tubular rod, a ring carried by the latch rod inclosing the tubular rod, a rod reciprocable in the tubular rod, and a link carried by the rod adapted to be projected laterally of the tubular rod for engaging the ring to release the latch rod from the segment.

12. In a combined transmission and brake controlling mechanism for automobiles, the combination with transmission and brake mechanism, of a single device for operating both of said mechanisms, said device comprising a rotatable tubular shaft having gear connections with the transmission mechanism, a rod reciprocably splined in the tubular shaft and operatively engaged with the brake mechanism, a rack segment supported on the cowl of the automobile, a pivoted brake lever carrying a latch rod movable over the rack segment, connections between the brake lever and automobile brakes, and cooperating means carried by the reciprocating rod and brake lever for operating the brake lever upon a pull on the reciprocating rod, said latch rod having a slotted opening therein for inclosing the rack segment.

13. In a combined transmission and brake controlling mechanism for automobiles, the combination with transmission and brake mechanism, of a single device for operating both of said mechanisms, said device comprising a rotatable tubular shaft having gear connections with the transmission mechanism, a rod reciprocably splined in the tubular shaft and operatively engaged with the brake mechanism, a rack segment supported on the cowl of the automobile, a pivoted brake lever carrying a latch rod movable over the rack segment, connections between the brake lever and automobile brakes, and cooperating means carried by the reciprocating rod and brake lever for operating the brake lever upon a pull on the reciprocating rod, said latch rod having a slotted opening therein for inclosing the rack segment, a spring interposed between the bottom wall of the slot and the rack segment and a latch dog at the upper end of the slot.

14. In a combined transmission and brake controlling mechanism for automobiles, the combination with transmission and brake mechanism of standard construction, of a single device for operating both of said mechanisms, said device comprising a rotatable tubular shaft having gear connections with the transmission mechanism, a rod reciprocably splined in the tubular shaft and operatively engaged with the brake mechanism, and manually operable means carried by said rod for effecting release of the brake mechanism.

In testimony whereof we affix our signatures.

FRANK R. LANZILLOTTA.
CONSTANT MOCCIA.